United States Patent
Bu

(10) Patent No.: US 8,657,216 B2
(45) Date of Patent: Feb. 25, 2014

(54) APPARATUS AND METHOD FOR SEPARATION OF WASTE MATERIAL

(75) Inventor: Bjørn Bu, Holmestrand (NO)

(73) Assignee: Norsk Biogass AS, Hvalstad (NO)

( * ) Notice: Subject to any disclaimer, the term of this patent is extended or adjusted under 35 U.S.C. 154(b) by 276 days.

(21) Appl. No.: 12/297,644

(22) PCT Filed: Apr. 30, 2007

(86) PCT No.: PCT/NO2007/000152
§ 371 (c)(1),
(2), (4) Date: Dec. 29, 2008

(87) PCT Pub. No.: WO2007/129900
PCT Pub. Date: Nov. 15, 2007

(65) Prior Publication Data
US 2009/0101739 A1   Apr. 23, 2009

(30) Foreign Application Priority Data
May 2, 2006   (NO) .................................. 20061940

(51) Int. Cl.
*B02C 19/00* (2006.01)

(52) U.S. Cl.
USPC ............................................. 241/14; 241/242

(58) Field of Classification Search
USPC ................ 241/73, 242, 285.2, 285.3, 286, 14
See application file for complete search history.

(56) References Cited

U.S. PATENT DOCUMENTS

| | | | | |
|---|---|---|---|---|
| 2,232,828 A * | 2/1941 | Roddy | ............................. | 241/73 |
| 3,761,024 A * | 9/1973 | Schwey et al. | .................. | 241/23 |
| 3,826,433 A * | 7/1974 | Erickson et al. | ................ | 241/14 |
| 4,000,860 A * | 1/1977 | Gotham | ......................... | 241/242 |
| 4,500,040 A * | 2/1985 | Steffens | .......................... | 241/14 |
| 4,664,320 A * | 5/1987 | Steffens | .......................... | 241/60 |
| 5,184,782 A * | 2/1993 | Kerstges et al. | .............. | 241/171 |
| 5,616,356 A * | 4/1997 | Buhler et al. | ............... | 426/443 |
| 5,746,377 A * | 5/1998 | Gehrig | ............................ | 241/73 |
| 6,073,866 A * | 6/2000 | Silver et al. | ..................... | 241/19 |
| 6,926,215 B2 * | 8/2005 | Elliott | ........................ | 241/188.1 |
| 6,978,956 B2 * | 12/2005 | Maynard | ....................... | 241/224 |
| 7,600,708 B2 * | 10/2009 | Karlsson et al. | ................ | 241/73 |
| 7,766,263 B2 * | 8/2010 | Karlsson et al. | ................ | 241/73 |

FOREIGN PATENT DOCUMENTS

| | | |
|---|---|---|
| DE | 3343788 | 6/1985 |
| DE | 4400297 A1 | 7/1995 |
| DE | 19600482 | 5/1997 |
| DE | 10137008 01 | 1/2003 |

(Continued)

OTHER PUBLICATIONS

GE Search Report of Nov. 1, 2011, submitted inter alia as statement of relevance for foreign language references cited therein.

*Primary Examiner* — Faye Francis
(74) *Attorney, Agent, or Firm* — Christian D. Abel

(57) ABSTRACT

A machine and a method for providing substrate for use in manufacturing of biogas. The machine is provided with
  an intake for input of moist and dry organic waste to the machine's interior chamber, where the organic waste may contain foreign bodies such as soft packaging, metal, glass, etc.,
  a rotating shaft located in the chamber and provided with at least one tool which has a blunt shape,
  a stationary part mounted in the chamber acting as the tool's counter-tool,
  an outlet for milled particles, and
  an ejector for foreign bodies.
The distance between the tool and the stationary part is such that the solid parts are milled into smaller pieces, while a milling effect on softer parts is prevented.

1 Claim, 2 Drawing Sheets

(56) References Cited

FOREIGN PATENT DOCUMENTS

| GE | 1693 | 8/1999 |
|---|---|---|
| JP | 2002035629 | 2/2002 |
| JP | 2002177888 | 6/2002 |
| JP | 2003093910 | 4/2003 |
| RU | 2150385 | 6/2000 |
| SU | 1741903 | 6/1992 |
| SU | 1787531 | 1/1993 |
| WO | WO 03092922 | 11/2003 |
| WO | WO 2005061114 | 7/2005 |

* cited by examiner

APPARATUS AND METHOD FOR SEPARATION OF WASTE MATERIAL

FIELD OF THE INVENTION

The invention relates to a machine for providing organic particles, preferably substrate, for use in manufacturing biogas. More specifically, the machine is arranged for sorting, washing and milling the waste in order to obtain organic waste which has a specific particle size. The invention also relates to a method for providing organic particles, preferably substrate, for use in manufacturing biogas.

BACKGROUND OF THE INVENTION

The background to the invention is a desire to be able to utilise organic waste as raw material in biogas plants. The organic particles manufactured by means of the machine are often used as biogas substrate. Requirements are placed on the size of the particle and in some cases, furthermore, there will also be a requirement for the substrate to be sanitised (preferably sterilised) before being used as substrate for manufacturing biogas.

Several types of process exist today for manufacturing biogas substrate from waste. Two principles which may be mentioned here are the pulping technique and the milling process.

The pulping technique may be employed on different scales and it can also handle heavily polluted waste. It resembles a mixer in its mode of operation. The waste is combined with liquid and mixed in a tank. Low-weight waste such as plastic will float up and then be removed. Heavier waste such as metal etc. will sink to the bottom. The organic waste will stay in the middle of the tank where it is shredded by the knives. This technique is expensive and has a low dry solids value since a lot of liquid is added during the process. The term dry solids value refers to how great a portion of the substrate has energy content. The low dry solids value means that the pulping plant should be located near the biogas plant in order to avoid major transport costs.

A conventional milling machine has a feed screw that feeds the raw material through a set of knives and a screen. The raw material is forced through a rotating set of knives which shreds the raw material into a fine mass which is then pressed out through a screen. By having the correct diameter on the holes of the screen, it is possible to prevent excessively large particles from being admitted to the finished product. The milling process requires finely-screened raw material. The addition of large particles and non-organic material such as metal or glass in a milling process will lead to shut-down or machine breakdown.

From the patent literature several publications are known presenting examples of the use of pulping and milling technology in industrial processes in order to produce biogas substrate.

In WO 2005061114 a plant is described for treating moist organic waste. The plant is composed of several stations where the organic waste is first treated in a mill which coarsely shreds both the organic waste and the plastics into a specific particle size. A resilient counter-steel is employed in order to avoid the mill being destroyed if the waste should contain metal. After the mill, the milled material is transferred to a unit which dissolves the particles into smaller particles. This dissolving process is implemented by adding liquid to the particles in a conical container, at the bottom of which is a tool with high rotational speed and saw blade-shaped teeth. In this process (the pulping process) the mixture's organic waste is ground into smaller particles and the plastic is ground into slightly larger particles, while heavy objects drop to the bottom of the container. With the exception of the heavy objects, the mixture is transferred to the next station where the plastic is screened out by means of a screw separator.

In WO 03092922, moreover, a plant is described where it is necessary to add liquid in order to obtain a satisfactory process. In the plant the process is also conducted in stages at several stations. In a first stage moisture is added and mixed with the waste, in the next stage the moist waste is heated until the moisture is converted to hot steam, thus causing the waste to be boiled and pulp obtained with low moisture content. The process described in WO 03092922 is therefore a pulping process.

SUMMARY OF THE INVENTION

It is an object of the present invention to provide a machine which manufactures biogas substrate with a high dry solids content. Furthermore, the machine is capable in a simple manner of screening out foreign objects located in the waste mixture fed into the machine. It is a special advantage of the machine that it is not necessary to remove the packaging from the food before the food is deposited in the machine. The machine is adapted for handling many different packaging categories such as plastics, netting and binding twine often used round meat, metal and glass packaging, etc.

With this kind of waste handling, the separation of the plastics mixed with the waste is a particular problem. Thus it is a further object of the present invention to obtain a simple separation of the plastics. It has been shown that the machine according to the invention is also capable of handling different types of soft packaging such as netting and binding twine in the same way as it handles plastics. For the sake of simplicity, the machine will be described hereinafter in relation to the handling of plastics, but it should be understood that the scope of protection also includes all types of soft packaging.

In machines according to the prior art, the plastic material is milled into small pieces together with the rest of the waste. The separation of the plastic takes place subsequently often in a separate process.

The machine according to the invention is a so-called all-in-one machine. This means that the machine performs several of the functions which according to the prior art are handled by different stations or by several machines forming part of a larger plant as explained earlier. The multi-functional machine is capable of producing organic particles of a size suitable for use as biogas substrate. The machine is also designed to separate foreign bodies from the organic waste and to wash the foreign bodies clean before they are sent for further treatment. In this context, foreign bodies refers to elements of plastic, glass and metal which are often mixed together with the organic waste fed into the machine.

When using the machine according to the invention it is not necessary to conduct a preliminary sorting similar to that described, for example, in WO 2005061114. The waste that is to be treated is fed into the machine where the organic waste is processed into small-sized particles, while foreign bodies are separated from the organic waste and the plastic material is separated from other foreign bodies such as metal and glass.

When using the machine according to the invention it is not necessary to add liquid such as, for example, water in order to achieve the decomposition of the organic waste into a suitable particle size. Nor is the waste heated in the machine. In the processes described in the said publications, liquid is added in order to obtain a decomposition of the organic waste and in some cases the waste is heated. There are relatively large financial savings involved since by using the machine according to the invention it is not necessary to add liquid or supply energy for heating.

The machine according to the invention is based on the fact that the dry organic waste is mixed with moist waste, e.g. cooking oils, blood or other waste with high moisture content. The moist organic waste will help to dissolve the dry organic waste in the machine.

The machine is designed with an intake, where moist and dry organic waste, which will also normally contain foreign bodies such as plastics, metal and glass, is fed into the interior of the chamber. In the interior of the chamber there is mounted a rotating shaft. The shaft is provided with at least one tool, but preferably several tools which are positioned at the circumference of the shaft. The tool/tools are blunt in form. A stationary part is also mounted in the chamber. The stationary part acts as the tool's counter-tool. The machine also has an outlet for substrate, as well as an ejector for foreign bodies. The distance between the milling tool and the stationary part is adapted so as to achieve a milling effect on the solid parts of the waste for grinding into smaller pieces when they pass between the tool and the counter-tool. The distance, however, is adapted so as to prevent the grinding effect being exerted on softer parts such as soft packaging, preferably plastics and netting/binding twine for meat packaging.

In the machine the following process takes place: the moist and dry organic waste is mixed together in the chamber, this mixing preferably being provided by movement of the shaft. The waste's solid parts are milled into smaller parts and the moist part of the organic waste contributes to dissolving the solid organic particles in the chamber. A certain proportion of foreign bodies such as glass and metal will also be ground up into smaller parts. The plastic material is not milled since the distance between the tool and the counter-tool is too great and since the tool has a blunt shape. The plastic material therefore substantially retains its size. When the organic waste particles have been milled to a specific size, they are discharged through an outlet provided in the machine, together with the parts of the foreign bodies (glass and metal) which have been milled to a size that permits them to pass through the outlet. Foreign bodies of a greater size remain in the machine's chamber and will be discharged from the machine together with the plastics.

The distance between the tool and the stationary part will be between 5 and 10 mm, but other sizes may also be selected depending on the type of material to be processed in the machine. The distance may therefore be adjustable, for example by the tool being mounted in such a manner that it can be adjusted, or the possibilities for adjustment may be provided in another way. The shaft will preferably be provided with a plurality of tools which may be located at equal or unequal intervals along the circumference of the shaft.

The outlet for the substrate is located in the bottom portion of the machine. Furthermore, a grid or a screen is mounted immediately above the outlet. There is a public requirement that the biogas substrate's particle size should not exceed 12 mm. This requirement is satisfied by means of the machine. The size of the openings in the screen may vary, for example, within the range 4-25 mm. Metal and glass, which are ground up into particles of a size that permits them to pass through the openings in the screen, will be discharged through the outlet, but will subsequently sink and be deposited on the bottom of the succeeding treatment tanks.

As waste is added to the machine, a dough of organic mass and foreign bodies will develop, filling up the chamber. This will stop the process from working and there is a need to break up the dough and remove the foreign bodies. It is important to have the foreign bodies washed before they are screened out, since they are destined for further treatment. Without a washing process the foreign bodies will become very sticky and difficult to handle. For economic and environmental reasons it is also desirable to retain as much as possible of the organic material that is valuable. Washing of the foreign bodies is conducted by means of nozzles which are arranged for introducing hot steam into the chamber. Furthermore, an ejector for foreign bodies is located in the machine's upper portion, preferably placed in a side wall immediately above the rotating shaft.

When the foreign bodies have to be washed, the supply of waste to the machine's chamber is stopped, while the shaft continues to rotate. Hot steam is discharged through the nozzles, washing the organic waste stuck on the foreign bodies. The washed-off organic waste is discharged through the outlet. The plastic material collected in the chamber follows the movement of the shaft and is expelled from the ejector together with foreign bodies of, e.g. metal and glass which have a particle size that is too large to be discharged through the outlet like the biogas substrate. The machine is thereby automatic and there is therefore no need for manual control. On the outside of the ejector, which may for example be in the form of a flap, a device is mounted to collect the waste and transport it away. When the machine chamber is empty, the ejector is closed and input can start again.

BRIEF DESCRIPTION OF THE DRAWINGS

The invention will now be described by means of an example of an embodiment of the invention which is illustrated in the attached drawings, in which.

DETAILED DESCRIPTION OF THE INVENTION

Figure 1:
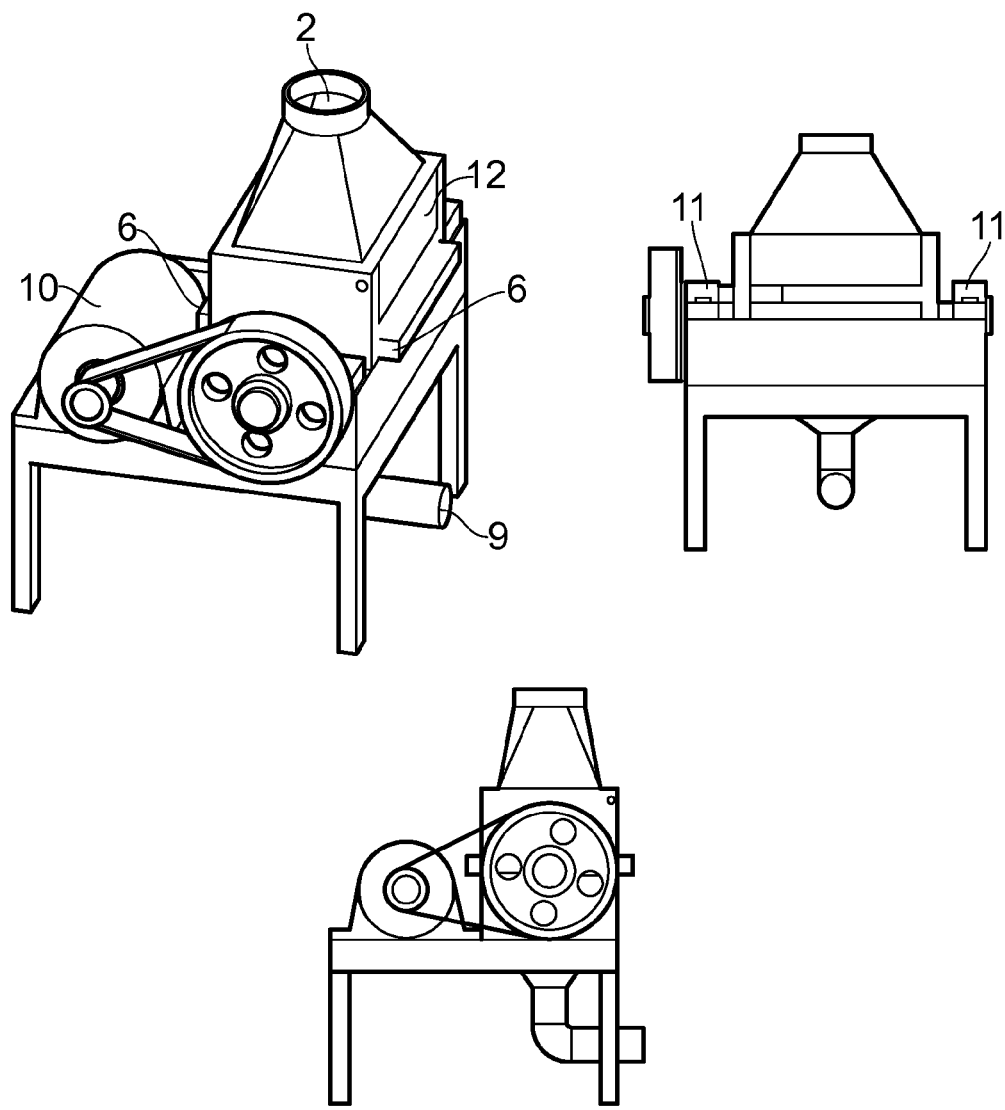
FIG. 1 is a perspective view together with two different side views of the machine according to the invention.
Figure 2:
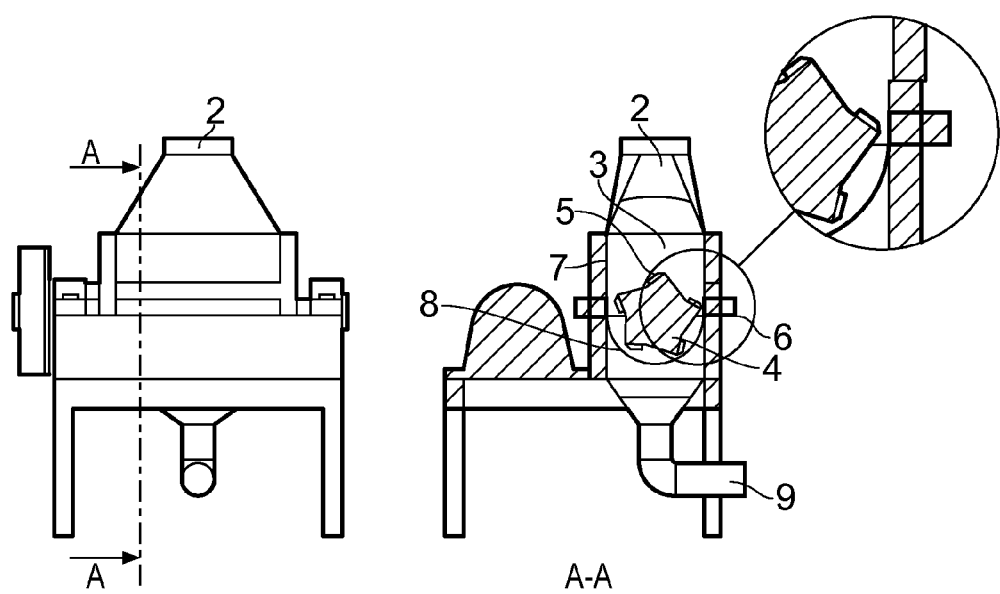
FIG. 2 illustrates a section through the machine, together with a view of a detail of the machine.

In the figures a machine 1 is illustrated for sorting, milling and washing waste. An intake 2 is provided at the top portion of the machine. All types of waste, such as moist and dry organic waste mixed with foreign bodies such as plastic, binding twine, metal, glass and other packaging are fed into the intake 2 to the interior chamber 3 of the machine. In the interior chamber 3 a rotating shaft 4 is mounted on which are attached several tools 5 at intervals along the circumference of the shaft 4. The shaft 4 is driven by a motor 10 and is mounted on bearings 11. The machine is further provided with a counter-tool 6. The shaft's tool 5 is adjusted in such a manner that there is a distance to the counter-tool 6. This distance may vary, but a distance of 5-10 mm will be preferred. The shaft's tool 5 is blunt in shape. On account of this shape as well as the distance to the counter-tool 6, there is no cutting effect but rather a milling effect on the solid particles in the waste passed between the tool 5 and the counter-tool 6. Waste of different kinds such as organic waste, metal and glass will therefore be ground up into smaller pieces. A further contribution is made to the fragmentation of the organic waste by the chamber 3 being filled with both wet and dry organic waste together. By means of this mixture of waste, the moisture from the wet waste helps to dissolve the dry organic waste, and it will not be necessary to add additional liquid to the process.

The distance between the tool 5 and the counter-tool 6 together with the blunt shape of the tool 5 permit packaging such as plastic, twine and netting used for wrapping food to pass between the tools without being ground up into small pieces, thereby substantially retaining its original size in the chamber. In the bottom of the chamber a screen 8, or sieve, is located provided with openings, each of which has a size preferably between 4 mm and 25 m. This screen 8 admits the organic particles and metal and glass particles which are milled to a size matching the size of the openings in the screen. From here the particles are discharged through an outlet 9 to storage tanks. Ground-up glass and metal particles of a size that permits them to be passed through the screen 8 will be discharged through the outlet and sink to the bottom of the storage tanks.

As the machine's chamber is filled with waste, an accumulation of foreign bodies will build up in the chamber, as well as a dough of organic mass. The separation of small-particle organic mass will no longer function as efficiently. At this point it is necessary to perform a purge of foreign bodies from the chamber, before the waste sorting can continue. The supply of waste to the chamber will then be stopped. Hot steam is added to the chamber through nozzles 7. By means of the steam the organic mass is broken up and forced out through the outlet 9. At the same time the foreign bodies are washed clean before proceeding to further treatment. The shaft continues to rotate while the chamber's contents are washed. The shaft's rotation causes the remaining foreign bodies (the plastic, twine, netting, glass, metal, etc.) located in the chamber to be thrown out through the ejector 12 in the upper portion of the machine. In this stage the object is achieved that the chamber is emptied of foreign bodies. The chamber is thereafter again ready to receive waste for further sorting and treatment.

The invention claimed is:

1. A method for milling, washing and sorting organic and non-organic waste and for obtaining organic particles for use in manufacturing of biogas by using a machine comprising an interior chamber in which there is provided a rotating shaft with at least one milling tool with a blunt shape and where the interior chamber is provided with a counter-tool, wherein the method comprises the steps of feeding moist and dry organic waste into the interior chamber, the moist and the dry organic waste containing non-organic waste, the non-organic waste comprising soft parts and/or solid parts;

rotating the shaft such that the moist and the dry organic waste are mixed together in the interior chamber, and such that said solid parts, if said solid parts are present in the interior chamber, are milled by the milling tool while said soft parts, if said soft parts are present in the interior chamber, are not milled by the milling tool, but substantially retain their size;

stopping the supply of waste to the machine's interior chamber while letting the shaft continue rotating;

discharging hot steam through nozzles, which are provided in the interior chamber, in order to wash off the organic waste stuck to said soft parts of the non-organic waste, if present in the interior chamber, and/or in order to break up a dough which has been formed by the waste in the interior chamber, discharging the organic waste particles through an outlet in the machine when they have been milled to a specific size and expelling remaining non-organic waste through an ejector.

\* \* \* \* \*